3,138,641
STABILIZED COMPOSITIONS
Eugene L. Powers, New Martinsville, W. Va., assignor to Mobay Chemical Company, Pittsburgh, Pa., a corporation of Delaware
No Drawing. Filed July 16, 1962, Ser. No. 210,230
8 Claims. (Cl. 260—578)

This invention relates to the stabilization of aromatic amines, and more particularly to the stabilization of tolylene diamines against deterioration and discoloration during storage.

The tolylene diamines are used in great quantities as starting materials in the manufacture of diisocyanates as well as in many other chemical systems leading to the production of synthetic resins and plastics such as polyurethanes. These tolylene diamines are normally substantially colorless when first prepared, but are found to darken quite rapidly during storage when exposed to light and/or elevated temperatures and/or air. This darkening phenomenon obviously detracts from the desirability of these compounds, particularly with regard to some end uses.

Various means have been suggested to overcome the problem of darkening of aromatic amines, most of which suggestions involve the addition of organic or inorganic stabilizers to the amines.

Though some of the previously suggested stabilizers have been found to be fairly effective in inhibiting discoloration of some types of organic amines during storage, most of these suggested stabilizers have been found to be ineffective or of questionable value when used with tolylene diamines.

It is an object of the present invention to provide compositions comprising essentially tolylene diamines or mixtures thereof having improved stability. Another object of this invention is to provide a process for inhibiting discoloration of tolylene diamines or mixtures thereof.

In general, the present invention comprises adding to a composition consisting essentially of tolylene diamines or mixtures thereof as a stabilizer bismuth subsalicylate. The invention further comprises the thus stabilized compositions.

The tolylene diamines include 2,3-, 2,4-, 2,5- 2,6-, 3,4- and 3,5-tolylene diamines.

As has been stated, the stabilized compositions may also comprise mixtures of two or more tolylene diamines. A particularly preferred composition is one comprising a mixture of 2,4-tolylene diamine and up to about 40% by weight of 2,6-tolylene diamine. More particularly, preferred compositions of this type are those comprising a mixture of 80% 2,4-tolylene diamine and 20% 2,6-tolylene diamine or 65% 2,4-tolylene diamine and 35% 2,6-tolylene diamine.

It has been found that the above-discussed tolylene diamine compositions are rendered substantially more stable against discoloration during storage by adding thereto a small amount of bismuth subsalicylate. In general, bismuth subsalicylate has been found to be an excellent stabilizer when used in various amounts up to about 5% by weight based on the weight of the tolylene diamines. It is preferred to use from about 0.1% to about 1% by weight of the stabilizer, and most preferably at least 0.5% by weight.

The invention is further illustrated by the following examples in which parts are by weight unless otherwise specified.

*Example 1*

In this example, samples were tested wherein approximately 500 cc. of a mixture of approximately 80% 2,4-tolylene diamine and 20% 2,6-tolylene diamine were introduced into 1 liter flasks. Air was excluded above the tolylene diamine mixture by flushing and blanketing with nitrogen gas after which 0.5% of bismuth subsalicylate was mixed with the liquid in each flask. The flasks were thereafter sealed and some were stored at room temperature (about 25° C.) on the light while others were stored at 50° C. in the dark. After twenty-seven days it was found that the samples stored in light at 25° C. had become light brown in color, while the samples stored at 50° C. in the dark were an even lighter brown. Control samples containing no stabilizer turned dark brown after one day under the same conditions.

*Example 2*

The same procedure as described above in connection with Example 1, when carried out with a tolylene diamine mixture comprising 65% 2,4-tolylene diamine and 35% 2,6-tolylene diamine, produces the same results.

There has been described above means for stabilizing tolylene diamines and mixtures thereof against discoloration by incorporating therewith a small portion of bismuth subsalicylate as a stabilizer. From the examples it is apparent that the stability of such compositions is far greater than is the case when no inhibitor is present, even though the control composition be stored under a blanket of nitrogen and in the dark.

Obviously, many modifications and variations of the present invention are possible in the light of the above teachings. It is therefore to be understood that within the scope of the appended claims, the invention may be practiced otherwise than as specifically described.

Although the invention has been described in considerable detail for the purpose of illustration, it is to be understood that variations can be made by those skilled in the art without departing from the spirit of the invention and scope of the claims.

What is claimed is:

1. A composition having improved stability against discoloration comprising tolylene diamine having added thereto from about 0.1% to about 5% of bismuth subsalicylate.

2. A composition according to claim 1 wherein said bismuth subsalicylate is present in a quantity of at least 0.5% by weight.

3. A composition according to claim 1 wherein said composition comprises a mixture of about 80% 2,4-tolylene diamine and about 20% 2,6-tolylene diamine.

4. A composition according to claim 1 containing a mixture of about 65% 2,4-tolylene diamine and about 35% 2,6-tolylene diamine.

5. A composition having improved stability against discoloration comprising a mixture of 2,4-tolylene diamine with up to about 40% 2,6-tolylene diamine having added thereto 0.1 to 5.0% of bismuth subsalicylate.

6. The method of inhibiting discoloration of tolylene diamines which comprises adding to said tolylene diamines 0.1 to 5.0% of bismuth subsalicylate.

7. The method according to claim 6 wherein said tolylene diamines comprise a mixture of 2,4-tolylene diamine with up to about 40% 2,6-tolylene diamine.

8. The method according to claim 7 wherein at least 0.5% of said bismuth subsalicylate is added.

No references cited.